United States Patent
Bruyneel et al.

(10) Patent No.: US 8,675,153 B2
(45) Date of Patent: Mar. 18, 2014

(54) DISPLAY DEVICE, METHOD OF CONTROLLING A LIGHT EMITTING DIODE ARRAY OF THE DISPLAY DEVICE, AND COMPUTER PROGRAM PRODUCT

(75) Inventors: Filip Bruyneel, Bruges (BE); Christophe Hoebeeck, Bruges (BE); Alfred Peeters, Bruges (BE); Dirck Seynaeve, Bruges (BE)

(73) Assignee: TP Vision Holding B.V., Eindhoven (NL)

( * ) Notice: Subject to any disclaimer, the term of this patent is extended or adjusted under 35 U.S.C. 154(b) by 432 days.

(21) Appl. No.: 13/123,044

(22) PCT Filed: Oct. 1, 2009

(86) PCT No.: PCT/IB2009/054291
§ 371 (c)(1),
(2), (4) Date: Apr. 7, 2011

(87) PCT Pub. No.: WO2010/041172
PCT Pub. Date: Apr. 15, 2010

(65) Prior Publication Data
US 2011/0194047 A1    Aug. 11, 2011

(30) Foreign Application Priority Data
Oct. 9, 2008 (EP) .................................. 08166188

(51) Int. Cl.
*G02F 1/13357* (2006.01)
*F21V 33/00* (2006.01)
*G09G 3/36* (2006.01)

(52) U.S. Cl.
USPC .............. 349/68; 349/65; 362/612; 362/97.2; 345/102

(58) Field of Classification Search
USPC .......... 349/61, 65, 68; 345/87, 102; 362/612, 362/613, 97.2, 97.3
See application file for complete search history.

(56) References Cited

U.S. PATENT DOCUMENTS

| | | | |
|---|---|---|---|
| 7,568,826 B2* | 8/2009 | Hamada et al. | 362/612 |
| 8,228,353 B2* | 7/2012 | Kwisthout et al. | 345/690 |
| 2007/0063961 A1* | 3/2007 | Kuroki | 345/102 |
| 2008/0129662 A1* | 6/2008 | Yoo et al. | 345/84 |
| 2009/0027588 A1* | 1/2009 | Medendorp et al. | 349/62 |
| 2009/0116261 A1* | 5/2009 | Chen et al. | 362/609 |

FOREIGN PATENT DOCUMENTS

| | | | |
|---|---|---|---|
| DE | 202005008776 | | 10/2005 |
| WO | 2005062608 | | 7/2005 |
| WO | 2005088390 | | 9/2005 |
| WO | 2006003603 | | 1/2006 |
| WO | 2006059263 | | 6/2006 |
| WO | 2007026285 | | 3/2007 |
| WO | WO 2008/068718 | * | 6/2008 |
| WO | 2008081387 | | 7/2008 |

* cited by examiner

*Primary Examiner* — Dung Nguyen
*Assistant Examiner* — Tai Duong
(74) *Attorney, Agent, or Firm* — Shimokaji & Assoc., P.C.

(57) ABSTRACT

A display device (10, 20, 30) is provided, the display device (10, 20, 30) comprising an LED array (33, 35, 12) working both as a backlight source for an LCD panel (31) and as an ambient light source providing ambient light with properties dependent on the image content presented by the LCD panel (31). A corresponding method and computer program product is also provided.

10 Claims, 8 Drawing Sheets

DISPLAY DEVICE, METHOD OF CONTROLLING A LIGHT EMITTING DIODE ARRAY OF THE DISPLAY DEVICE, AND COMPUTER PROGRAM PRODUCT

FIELD OF THE INVENTION

This invention pertains in general to the field of display backlighting. More particularly the invention relates to a backlighting device, system, and method.

BACKGROUND OF THE INVENTION

Visual display devices are well known and include cinematic film projectors, television sets, monitors, plasma displays, liquid crystal display LCD televisions, monitors, and projectors etc. Such devices are often employed to present images or image sequences to viewer.

The field of backlighting began in the 1960s due to the fact that televisions require a "darker" room for optimal viewing. Backlighting is in its simplest form white light, emitted from e.g. a light bulb, projected on a surface behind the visual display device. Backlighting has been suggested to be used to relax the iris and reduce eye strain.

During recent years the backlighting technology has become more sophisticated and there are several display devices on the market with integrated backlighting features that enables emitting colors with different brightness depending on the visual information presented on the display device.

The benefits of backlighting in general include: a deeper and more immersive viewing experience, improved color, contrast and detail for best picture quality, and reduced eye strain for more relaxed viewing. Different advantages of backlighting require different settings of the backlighting system. Reduced eye strain may require slow changing colors and a more or less fixed brightness while more immersive viewing experience may require an extension of the screen content i.e. the same brightness changes with the same speed as the screen content.

However, current backlighting systems are quite expensive and therefore there is a need of providing backlighting systems with reduced costs. Moreover, it would also be advantageous to reduce the depth size or thickness of current backlighting systems.

SUMMARY OF THE INVENTION

Accordingly, the present invention preferably seeks to mitigate, alleviate or eliminate one or more of the above-identified deficiencies in the art and disadvantages singly or in any combination and solves at least the above-mentioned problems by providing a display device, method, and computer program product according to the appended patent claims.

An idea of the present invention is to utilize the light source of the display device as the light source for the backlighting device.

Moreover, an idea of the present invention is to utilize at least a part of the circuitry of the display device as circuitry for the backlighting device, thereby reducing the total number of components required for current backlighting systems. The circuitries for a display system and a backlighting device are quite similar. In simplicity, one could say that almost the same components are used as circuitry for the display device and current backlighting devices. The processor, e.g. comprised in a LCD TV, used for processing a video signal and controlling the displaying of image content to the viewer could also be used to process information regarding displaying of backlight. At least part of the components of the circuitry of current display devices has more capacity to perform additional tasks. Hence, at least part of the processing of data regarding the backlighting device may be performed on the circuitry of the display device.

In an aspect a display device is provided. The display device comprises a Liquid Crystal Display connected to a Light Emitting Diode array having a number of Light Emitting Diodes. The display device is configured to display image content and display ambient light having properties being dependent on the image content. A first Light Emitting Diode of the Light Emitting Diode array is configured as a light source for the Liquid Crystal Display. A second Light Emitting Diode of the Light Emitting Diode array is configured to emit the ambient light.

In another aspect a method for displaying of light from a Light Emitting Diode array comprising a number of Light Emitting Diodes is provided. The method comprises controlling emission of light from a first Light Emitting Diode of the Light Emitting Diode array configured as a light source of a Liquid Crystal Display for displaying image content. Moreover, the method comprises controlling emission of ambient light from a second Light Emitting Diode of the Light Emitting Diode array, wherein the properties of the ambient light is dependent on the image content.

In yet another aspect a computer program product is provided. The computer program product is stored on a computer-readable medium comprising software code adapted to perform the steps of the method when executed on a data-processing apparatus.

The display device according to some embodiments provide for lower manufacturing costs and with reduced depth size or thickness compared to current solutions. Accordingly, the volume of the display device is also reduced.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

In current backlighting systems, the display device, such as a TV, and the device providing backlight towards the user or backwards, e.g. onto a wall behind the display device, are two separate devices, however mostly incorporated into the same housing. Accordingly, the backlighting device and display device will respectively have its own circuitry and light source(s).

The term "backlight" as used herein may be interpreted as, having properties, such as brightness, luminescence, color, or chrominance, being dependent on the image content presented on a display device, that may be displayed both towards a user (front projection) and/or away from the user (back projection), e.g. onto a wall behind the display device. Thus the term "backlight" and "ambient light" are synonymously used throughout the present specification. In some embodiments backlight will only be displayed away from the viewer. In other embodiments backlight will only be displayed towards a viewer. However, a combination of displaying backlight towards and away from the user may be equally possible within the scope of the present specification.

The term "backlighting device" is considered to be a device that may emit backlight or ambient light.

The following description focuses on embodiments of the present invention applicable to a display device with backlighting functionality.

Figure 1:
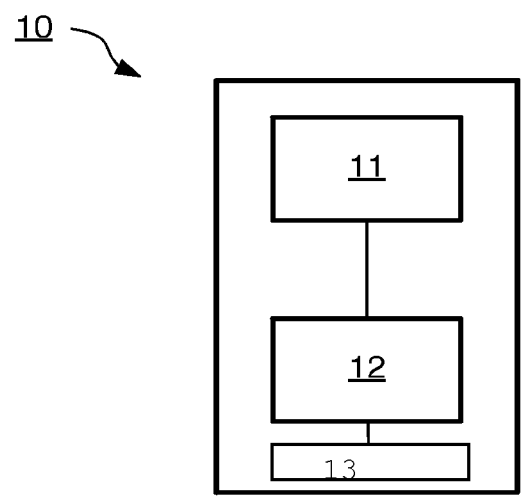
FIG. 1 is a display device according to an embodiment.

In an embodiment, according to FIG. 1, a display device 10 is provided. The display device comprises a Liquid Crystal display 11 connected to a Light Emitting Diode (LED) array 12. A non-transitory computer-readable medium 13 including software code may drive control of the LED array 12. The display device 10 is configured to display image content, such as an image sequence, to a viewer, and display backlight to the viewer, whereby a first part of the LED array is configured to emit light through the LCD display for displaying the image content, and a second part of the LED array is configured to emit light for displaying the backlight. The advantage of this embodiment is that the LEDs used for displaying the backlight is comprised in the same LED array as the LEDs used for displaying the image content. Accordingly, the effective required size of the display device might in this way be reduced compared to current solutions, due to a fewer number of required components. However, the LED array functioning as a light source for the LCD display, will compared to prior solution be made larger in order to enable the backlight effect functionality. Moreover, manufacturing costs of such a display device will be drastically reduced compared to current solutions since only one LED array is used, instead of two separate light sources, e.g. LED arrays, i.e. one light source for the LCD display and one light source for providing the backlight effect, in accordance with current solutions.

A further advantage is that the cost per lumen is lower when using a part of the LED array as light source for displaying the ambient light, instead of a separate LED array for displaying the ambient light, due to the higher volume of LEDs in a LED array for a LCD display. Moreover, manufacturing costs will also be lower when the light sources, such as LEDs, for providing the ambient light effect and the light sources for the LCD are provided on the same PCB instead of putting LEDs on dedicated boards for providing the backlight effect and boards for LCD backlighting. This is due to reduced process costs in board manufacturing, reduced handling costs.

Figure 2:
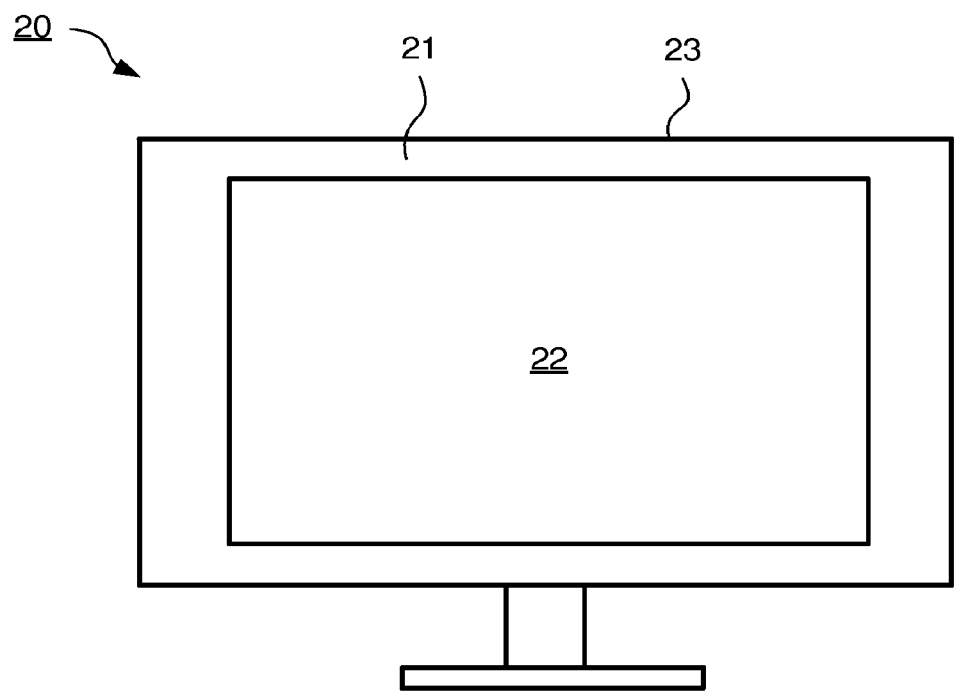
FIG. 2 is a cross section view display device according to an embodiment.

FIG. 2 illustrates a front view of a display device 20 according to an embodiment. The display device comprises a display region 22, such as a LCD display for displaying image content to the user, and an ambient light region 21 for displaying ambient light based on the image content presented in the display region. The ambient light region 21 may be covered by a front plate 37, and reflective layer 38 and/or an ambient light guide 381, being designed depending on the desired type ambient light (front, back, or back/front projection).

In FIG. 2 the ambient light region 21 has a frame shape, thus surrounding the display region 22 utilized for displaying the image content to the viewer. However, any shape of the ambient light region 21 may be provided.

Figure 3A:
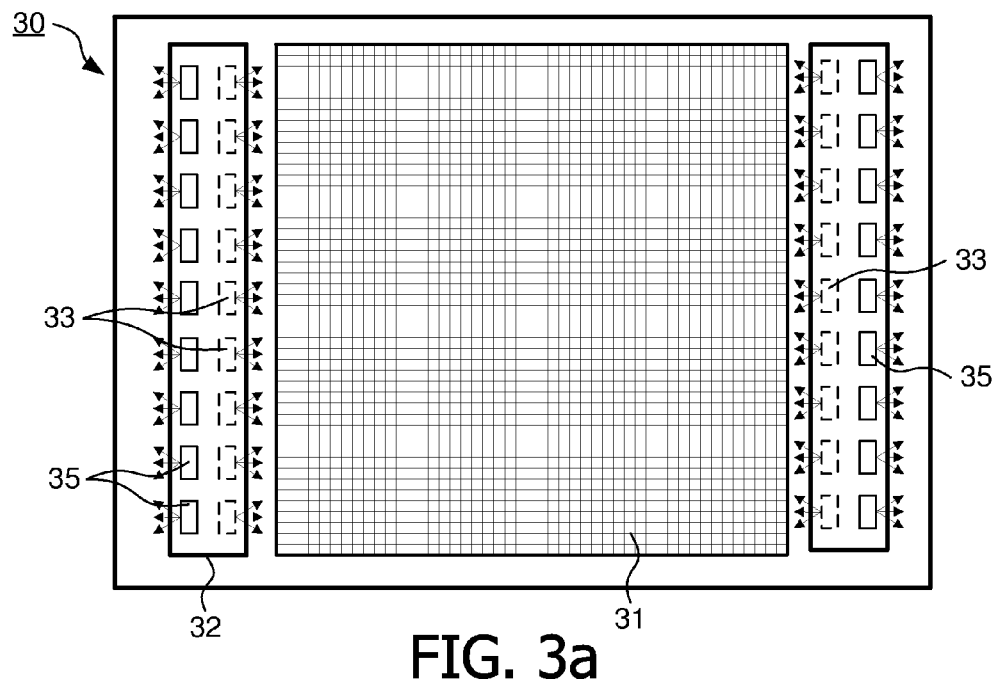
FIG. 3*a* is a front view of a display device according to an embodiment.

In an embodiment the LED array comprises a side emitting LED. FIG. 3a illustrates a front view of a display device 30 according to an embodiment, using side emitting LEDs. FIG. 3a illustrates an LCD display 31, and a printed circuit board 32 onto which a number of LEDs are connected in an array. In this embodiment, the LED array comprises two columns of LEDs, whereby the columns of LEDs 33 closest to the LCD display project light into a light guide 34 situated behind the LCD display. The column of LEDs 35 located further away from the screen is used to provide the ambient light.

Figure 3B:
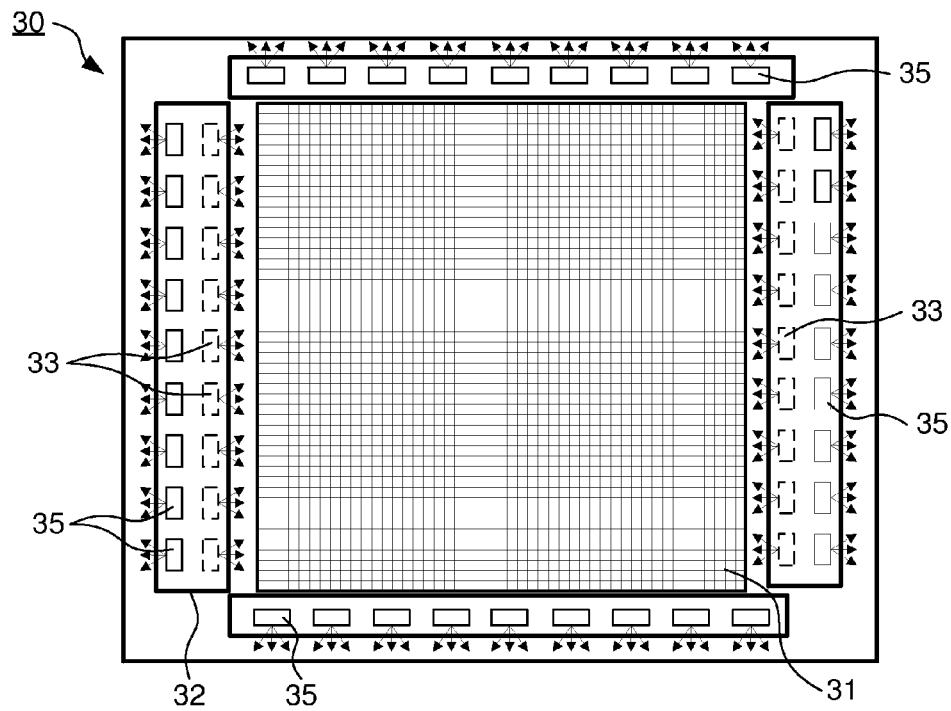
FIG. 3*b* is a front view of a display device according to an embodiment.
Figure 3C:
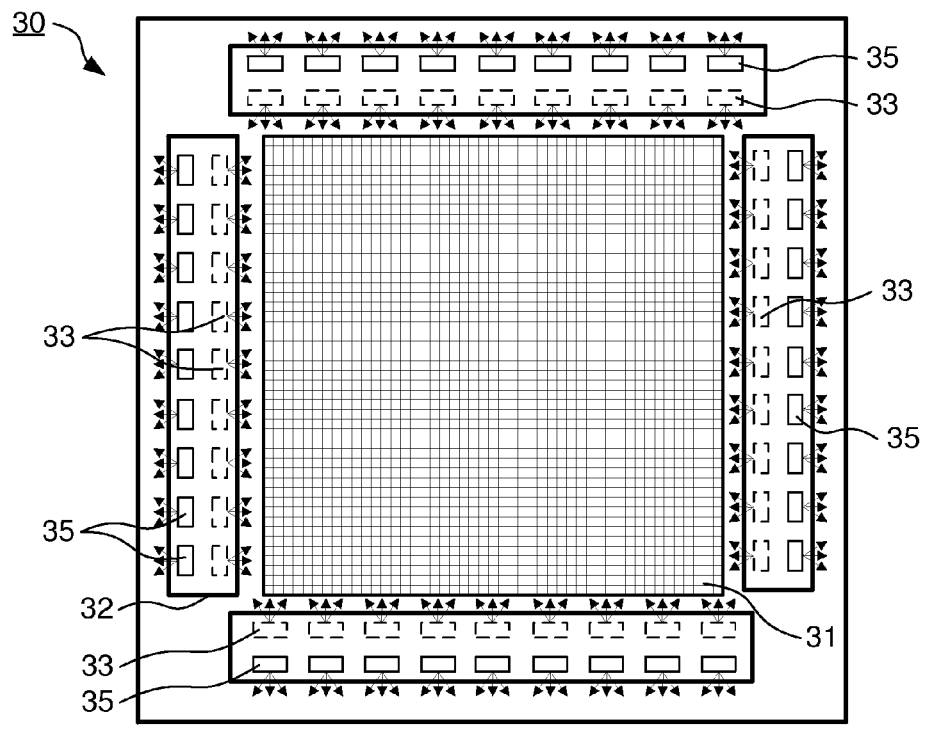
FIG. 3*c* is a front view of a display device according to an embodiment.

In some embodiments the LED array is also situated over and/or below the display region as disclosed in FIGS. 3b and 3c. In FIG. 3b, the LED array comprises a row of LEDs above and below the display region. In FIG. 3c, the LED array further comprises two rows of LEDs, located both below and above the display region, whereby one of the two rows projects ambient light and the other row acting as a light source for the LCD display.

Figure 3D:
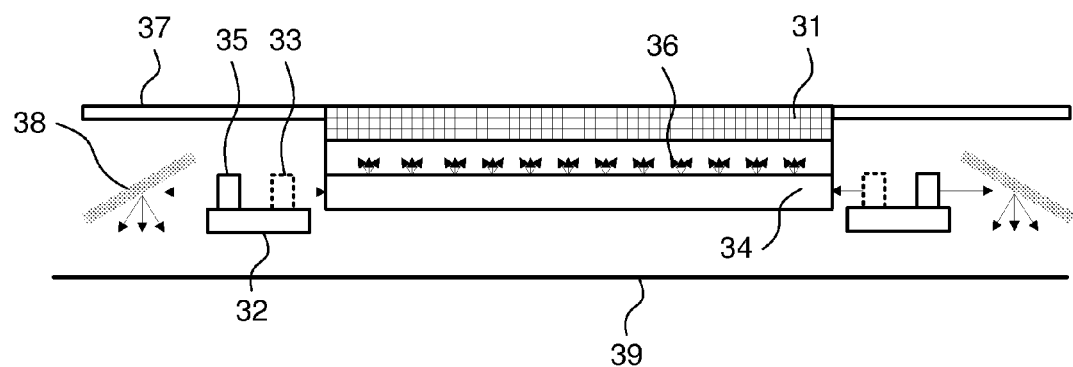
FIG. 3*d* a top view of a display device according to an embodiment.

FIG. 3d is a top view of the display device of FIG. 3a, wherein the structure of the display device is further enlightened. Between the LCD display 31 and the light guide 34 an optical stack LC display 36 e.g. comprising polarizing filters etc. is provided. The configuration of the light guide 34 and optical stack LC display 36 are commonly known to the person skilled in the art, comprising e.g. a polarizer and a diffuser.

The display device further comprises a front plate 37 situated adjacent to the LCD display covering a reflective layer 38. Depending on the desired ambient light effect, i.e. back projection, front projection, or back/front projection, the design of the reflective layer 38 and front plate 37 may differ.

The display device of FIG. 3d is configured to provide back projection of ambient light onto e.g. a wall 39. The front plate 37 in such an embodiment may thus be non-transparent such that the ambient light is prevented from being displayed towards the user. In FIG. 3d, the reflective layer 38 is designed such that the incident light, emitted from the side emitting LEDs 35, is reflected at an angle such that the reflected light may be projected backwards, e.g. onto a wall 39 situated behind the display device 30. The reflective layer 38 may e.g. be a non-transparent reflector reflecting all of the incident light emitted from the side emitting LEDs.

Figure 3E:
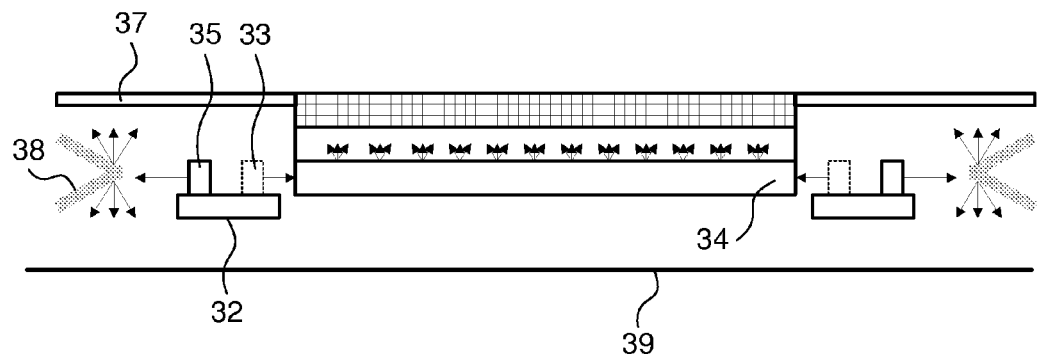
FIG. 3*e* a top view of a display device according to an embodiment.

FIG. 3e illustrates the display device 30 of FIG. 3a in another configuration, enabling both back and front projection of ambient light. Here, the reflective layer 38 may be designed to reflect the emitted light from the side emitting LEDs partly towards the front plate 37, and partly backwards e.g. onto a wall 39. In such an embodiment, the front plate 37 may be transparent or semi-transparent, enabling the reflected light from the reflective layer 38 to propagate through the front plate and be displayed on the front side of the display device, e.g. towards a user.

The front plate 37 may differ in configuration depending on the type of desired projection of ambient light. Typically, the transparency will be different depending on the type of desired projection (back, front, back/front) of ambient light. The front play may have any color such as white, black, etc, and be made of any material enabling the desired transparency.

Depending on the desired type of ambient light, and the configuration of LED array the configuration and design of the reflective layer 38 may vary. For example, the reflective layer 38 may be a reflector comprising PC ABS/PC with white paint or a metallic white diffusing reflector.

Instead or in conjunction with a reflective layer 38, an ambient light guide 381 may be utilized to project the ambient light.

Figure 3F:
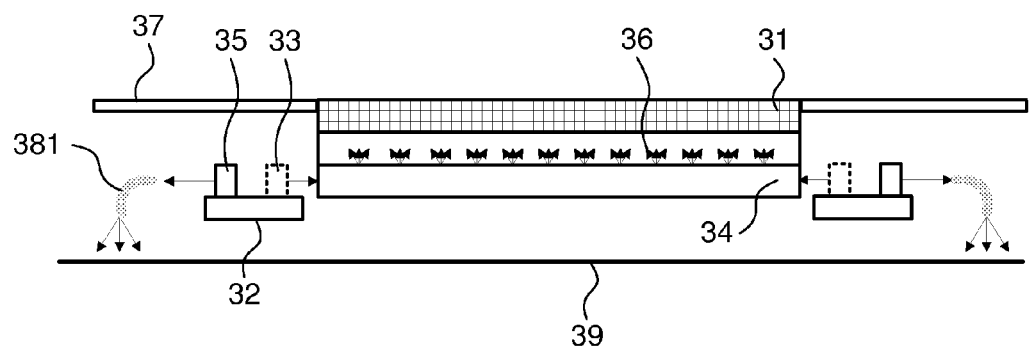
FIG. 3*f* a top view of a display device according to an embodiment.

FIG. 3f illustrates the display device 30 of FIG. 3a in another configuration wherein an ambient light guide 381 is utilized instead of the reflective layer in accordance with FIG. 3d.

Figure 3G:
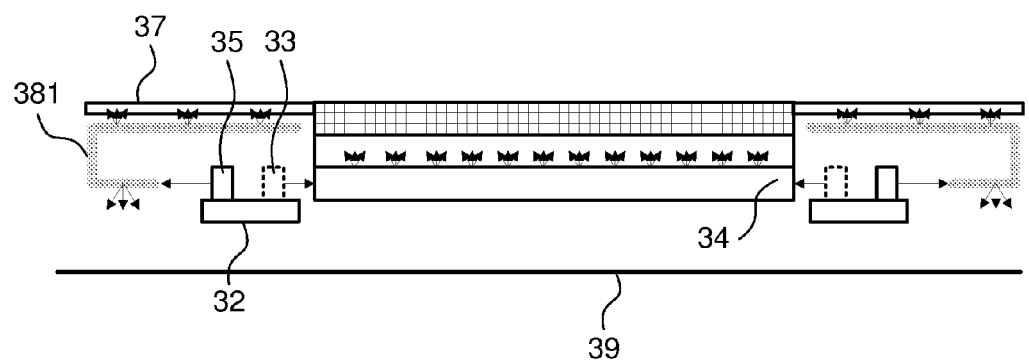
FIG. 3*g* a top view of a display device according to an embodiment.

FIG. 3g illustrates the display device 30 of FIG. 3a in another configuration wherein an ambient light guide 381 is utilized instead of the reflective layer in accordance with FIG. 3e.

FIGS. 4a to 4e illustrates a display device 40 according to other embodiments, for which the LED array 32 comprises one column of side emitting LEDs, whereby at least one 33 of the side emitting LEDs comprised in the LED array, are used as light sources for the LCD display 31, and at least one 35 is used to display ambient light.

Figure 4A:
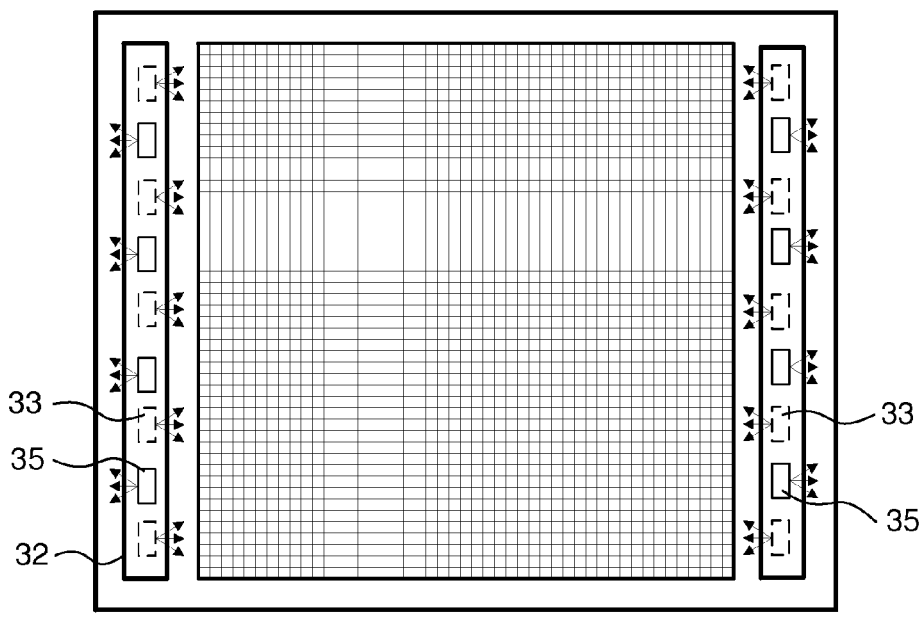
FIG. 4*a* is a front view of a display device according to an embodiment.
Figure 4B:
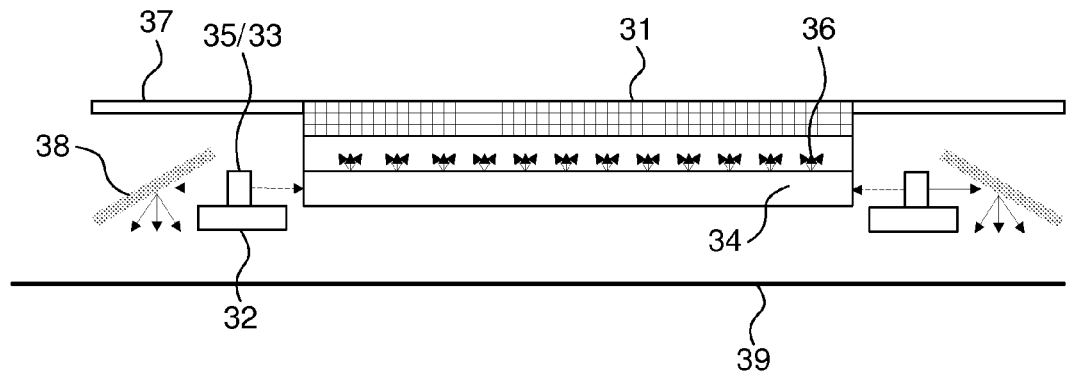
FIG. 4*b* a top view of a display device according to an embodiment.

FIG. 4b illustrates a similar configuration as FIG. 3b, however with the LED array in accordance with FIG. 4a.

Figure 4C:
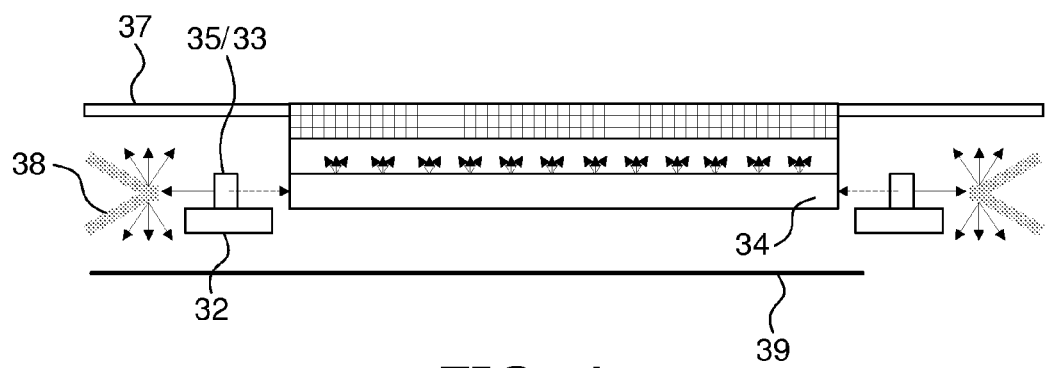
FIG. 4*c* a top view of a display device according to an embodiment.

FIG. 4c illustrates a similar configuration as FIG. 3c, however with the LED array in accordance with FIG. 4a.

Figure 4D:
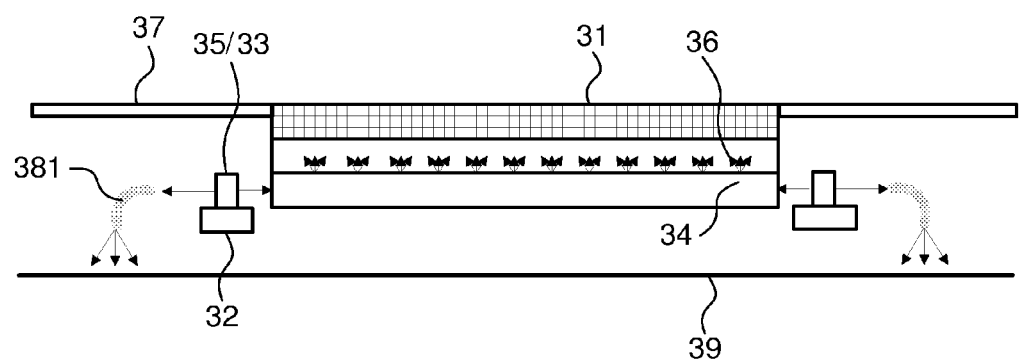
FIG. 4d a top view of a display device according to an embodiment.

FIG. 4d illustrates a similar configuration as FIG. 3f, however with the LED array in accordance with FIG. 4a.

Figure 4E:
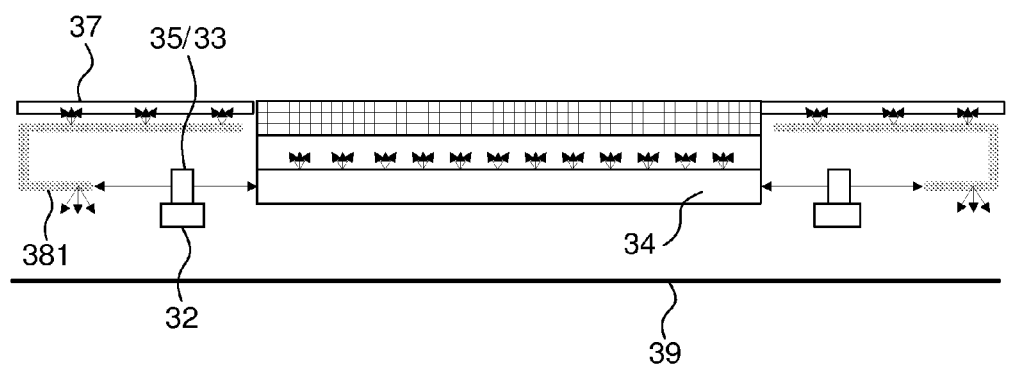
FIG. 4e a top view of a display device according to an embodiment.

FIG. 4e illustrates a similar configuration as FIG. 3g, however with the LED array in accordance with FIG. 4a.

FIG. 5 illustrates a front view of the display device according to an embodiment wherein top emitting LEDs are used in the LED array. In FIG. 5a the LED array comprises a number of top emitting LEDs 35 for displaying ambient light, and a number of top emitting LEDs 33 used as light sources for the LCD screen, wherein the ambient light LEDs 35 are provided in a frame surrounding the LCD display.

Figure 5A:
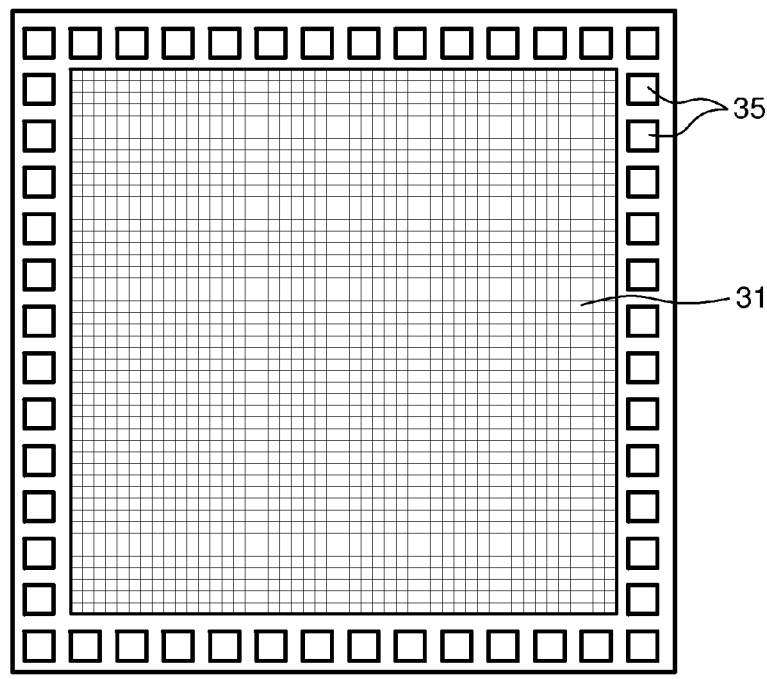
FIG. 5a is a front view of a display device according to an embodiment.
Figure 5B:
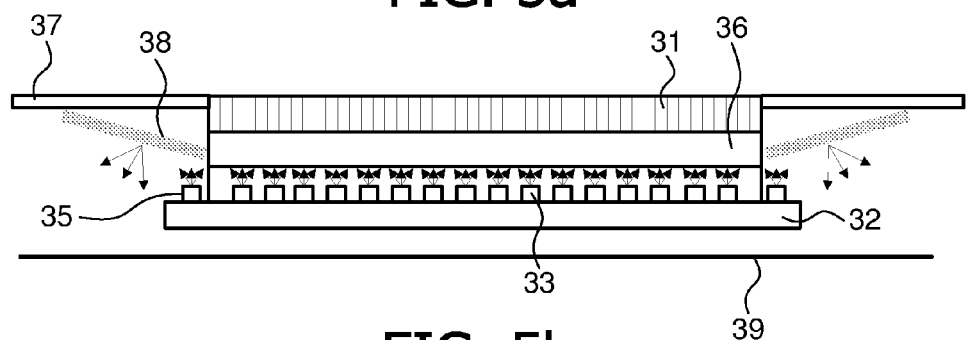
FIG. 5b a top view of a display device according to an embodiment.

FIG. 5b illustrates a top view of the display device in configuration, enabling back projection of ambient light utilizing a reflective layer 38.

Figure 5C:
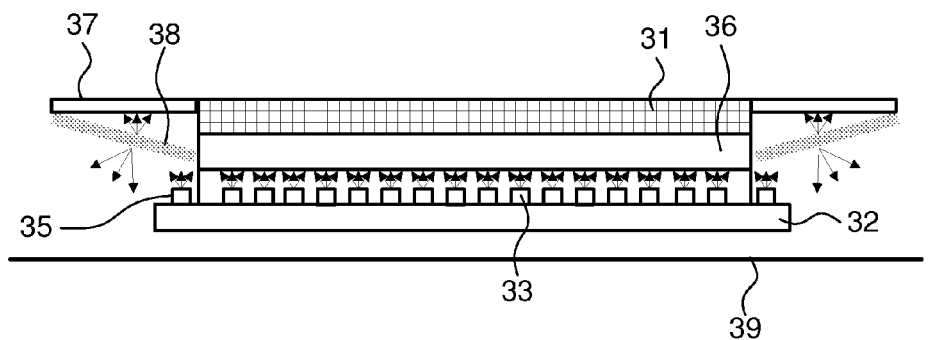
FIG. 5c a top view of a display device according to an embodiment.

FIG. 5c illustrates a top view of the display device in another configuration, enabling both back and front projection of ambient light utilizing a reflective layer 38.

Figure 5D:
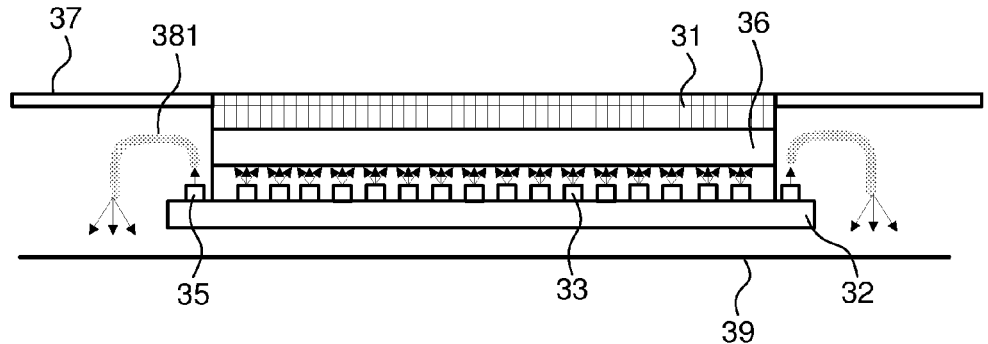
FIG. 5d a top view of a display device according to an embodiment.

FIG. 5d illustrates a similar configuration as FIG. 5b however with an ambient light guide 381 instead of a reflective layer 38.

Figure 5E:
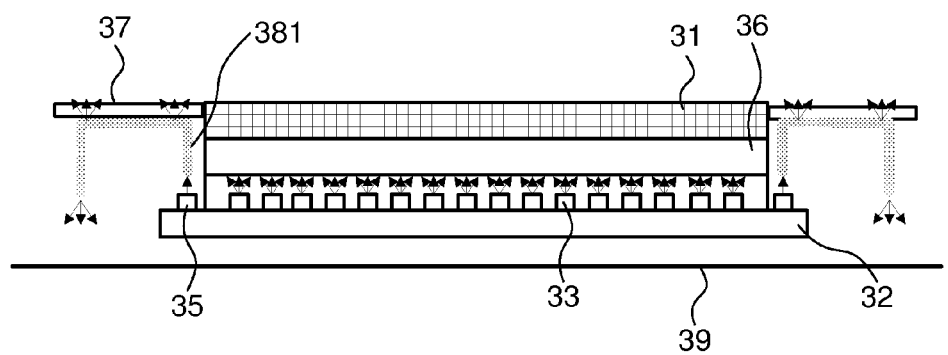
FIG. 5e a top view of a display device according to an embodiment.

FIG. 5e illustrates a similar configuration as FIG. 5c however with an ambient light guide 381 instead of a reflective layer 38.

Other LED array setups are equally possible within the idea of the invention. For example, in some embodiments a combination of top emitting LEDs and side emitting LEDs may be used.

The design or configuration of the LED array, including the configuration and positioning the LEDs used to display ambient light, may differ depending on the type of desired ambient light effect. For example, in an embodiment top emitting LEDs used to display ambient light are merely provided on the right and left sides of the LCD display.

It should be appreciated that any configuration of the LED array is possible within the embodiments of the present specification. Accordingly, the exemplary embodiments shown in FIGS. 3a to 3c, 4a to 4c, and 5a to 5c, should not be considered limiting the scope, but rather to visualize that the configuration of the display system may be changed in various ways without departing from the idea of the invention.

In an embodiment, the reflective layer 38 is semi reflective, i.e. enabling both transmission of light towards the viewer, and reflection of light e.g. towards a wall 39 located behind the display device.

In other embodiment the reflective layer 38 is fully reflective, such as in FIGS. 3d, 4b, and 5b, i.e. it does not allow the transmission of light there through.

In an embodiment the display device may comprise a combination of a semi reflective layer and a fully reflective layer, depending on the desired ambient light effect.

In a practical implementation, the display region, i.e. the LCD display, has the format 16:9. In the ideal situation, the image content to be presented on the LCD display is formatted in 16:9 format. However, in some cases the format of the image content differs from the format of LCD display. One common image content format is 4:3. When presenting 4:3 formatted image content onto a 16:9 display, if not zoomed, the 4:3 image content will not cover the entire 16:9 screen. Accordingly, in such a case at least one sub part of the display region will not display any image content, e.g. one rectangular part to the left and one rectangular part to the right of the presented 4:3 image content. Instead of letting this sub part of the display region remain black, throughout the displaying of the image content, in an embodiment, this sub part is used to display ambient light towards the viewer, using the LCD display.

In an exemplary embodiment the size of the LED array of the display device is 42". The LCD display may in this embodiment be 37". Accordingly, the space between 37" to 42" may be utilized for providing ambient light to the viewer.

The design of the circuitry or PCB board 32 comprised in the display device used for processing image data, e.g. comprised in a video signal, may differ depending on the design of the LED array. For example, the utilized currents may differ depending on whether top or side emitting LEDs are used.

In an embodiment all of the LEDs of the display device are positioned onto one PCB.

Figure 6:
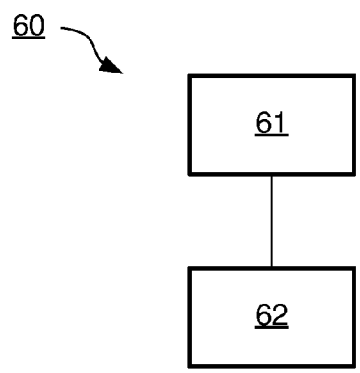
FIG. 6 is flow chart of a method according to an embodiment.

In an embodiment, according to FIG. 6, a method 60 for displaying of light from a Light Emitting Diode array comprising a number of Light Emitting Diodes is provided. The method comprises controlling 61 emission of light from a first Light Emitting Diode of the Light Emitting Diode array configured as a light source of a Liquid Crystal Display for displaying image content. The method also comprises controlling 62 emission of light from a second Light Emitting Diode of the Light Emitting Diode array for displaying ambient light, the properties of which being dependent on the displayed image content.

In an embodiment the method comprises steps for performing any one of the functionalities of the display device according to some embodiments.

In an embodiment a computer program product stored on a computer-readable medium comprising software code adapted to perform the steps of the method according some embodiments when executed on a data-processing apparatus is provided.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A display device, comprising:
   a liquid crystal display;
   a light emitting diode array coupled to the liquid crystal display, said light emitting diode array including a number of light emitting diodes, said display device configured to:
   display image content; and
   display ambient light having properties being dependent on said image content, wherein
   a first light emitting diode of said light emitting diode array is configured as a light source for said liquid crystal display, and
   a second light emitting diode of said light emitting diode array is configured to emit said ambient light, wherein the first and second light emitting diodes are disposed on a common substrate.

2. The display device according to claim 1, wherein the first or second light emitting diode is a side emitting diode.

3. The display device according to claim 1, wherein the first or second light emitting diode is a top emitting diode.

4. The display device according to claim 1, further comprising a reflective layer configured to at least partly reflect the light emitted from the second light emitting diode onto a surface.

5. The display device according to claim 1, further comprising an ambient light guide configured to receive ambient light from the second light emitting diode of said light emitting diode array, and to at least partly project said received ambient light onto a surface.

6. The display device according to claim 4, wherein said surface is a front plate comprised in said display device, wherein the front plate comprises a material being is at least partly transparent, enabling transmission of said reflected light.

7. The display device according to claim 4, wherein said surface is a surface exterior of said display device.

8. The display device according to claim 1, wherein said light emitting diode array is configured onto one printed circuit board.

9. A method for displaying of light from a light emitting diode array comprising a plurality of light emitting diodes positioned on a common substrate, the method comprising
   controlling emission of light from a first light emitting diode of said light emitting diode array configured as a light source of a liquid crystal display for displaying image content, and
   controlling emission of ambient light from a second light emitting diode of said light emitting diode array, wherein the properties of said ambient light is dependent on said image content.

10. A computer program product stored on a non-transitory computer-readable media for controlling a display of light from a light emitting diode array comprising a plurality of light emitting diodes positioned on a common substrate, the non-transitory computer-readable media comprising software code when executed on a data-processing apparatus performs the method comprising:
   controlling emission of light from a first light emitting diode of said light emitting diode array configured as a light source of a liquid crystal display for displaying image content, and
   controlling emission of ambient light from a second light emitting diode of said light emitting diode array, wherein the properties of said ambient light is dependent on said image content.

* * * * *